Z. Wheeler,
Band Pulley,
Nº 50,761. Patented Oct. 31, 1865.

Witnesses
Theo Tusch
Wm Treurn

Inventor
Zenas Wheeler
per Munn & Co
Attorneys

UNITED STATES PATENT OFFICE.

ZENAS WHEELER, OF SAN FRANCISCO, CALIFORNIA.

IMPROVEMENT IN FASTENING WHEELS AND PULLEYS TO SHAFTS.

Specification forming part of Letters Patent No. 50,761, dated October 31, 1865.

*To all whom it may concern:*

Be it known that I, ZENAS WHEELER, of San Francisco, San Francisco county, and State of California, have invented a new and useful Improvement in Mode of Fastening Wheels, Pulleys, &c., to Shafts; and I do hereby declare that the following is a full, clear, and exact description thereof, which will enable those skilled in the art to make and use the same, reference being had to the accompanying drawings, forming part of this specification, in which—

Figure 1:
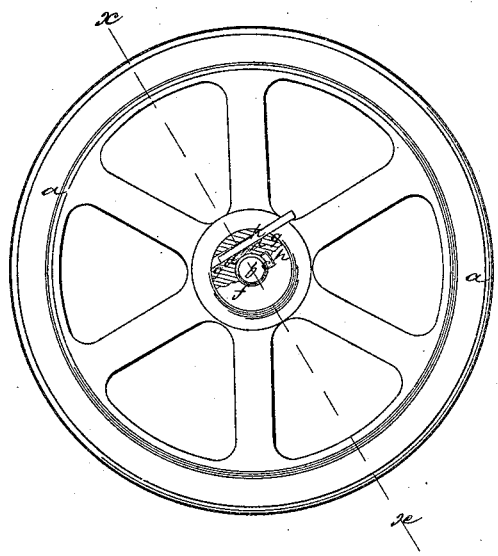
Figure 2:
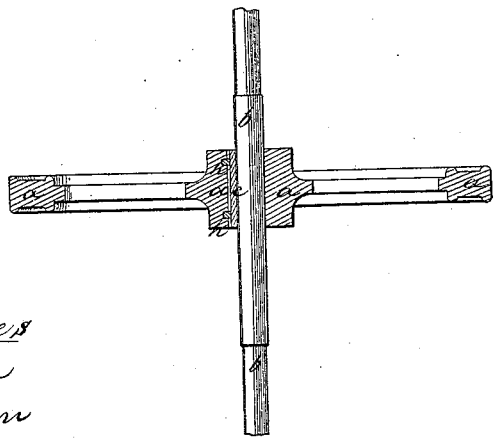

Figure 1 is a front view of a wheel attached to a shaft, and with my improvement represented in section; Fig. 2, a cross-section through wheel in plane of line $x\ x$, Fig. 1.

Similar letters of reference indicate like parts.

The present invention consists in inserting within a wheel, pulley, or other similar device, and so as to lie and bear upon its shaft in the direction of its length, one or more thin pieces or bars of metal, usually known as "feathers" with machinists, over and upon each of which, in a direction at right angles thereto, and through any proper-shaped openings in the wheel or pulley, cross-ties or keys, made of a tapering form from end to end, are brought to a bearing by being driven into the said apertures, thereby causing the said feather or feathers used to bear with any degree of force desired upon the shaft, whereby the wheel is securely held and prevented from turning thereon.

The advantages of the above mode of securing pulleys, &c., to their shafts are many, among which may be mentioned that pulleys when placed near together on a shaft can be easily keyed and unkeyed at pleasure.

$a\ a$ in the drawings represent a wheel, pulley, drum, or any other similar device used in machinery, and $b$ its shaft, to which it is secured, as follows: $c$, a thin bar or feather, of metal, placed within a cross-slot, $d$, of the central opening or axis $f$ of the same, and bearing upon the shaft $b$. Upon and across the upper surface of the feather $c$, into apertures $g\ g$, passing through the wheel at right angles, or nearly so, to the direction of the feather and shaft, wedge-shaped keys or cross-ties $h\ h$ are driven, and, coming to a bearing on the feather, tightly and securely hold the same down to and upon the shaft as long as may be desired. To unloosen the wheel from its shaft it is only necessary to drive or force out the keys, as in ordinary keying of pulleys, thus leaving the wheel free to be removed, as is evident.

In lieu of only one feather, as described, two or more may be used, and also, in lieu of using two keys to a feather, one only may be employed, or more if desired, it being only necessary that a sufficient number of keys should be used to each feather to securely hold and bind the same to the pulley-shaft.

From the above description it is evident that by my improved mode of fastening wheels to shafts they are securely and firmly fastened thereto, and they can be keyed without trouble as close together as may be desired, the advantage of which is manifest.

In addition to the use of the feather and cross-keys, arranged together as described, I find it desirable to attach to the shaft, or form a part thereof, and in the direction of its length, a short projecting piece or lip, $l$, over which fits a suitably-shaped groove, $m$, of the wheel, as is the case in the ordinary mode of keying wheels to shafts.

Having thus described my invention, I claim as new, and desire to secure by Letters Patent—

The mode herein described of fastening wheels, pulleys, drums, &c., to their shafts, the same consisting in the combination of one or more feathers, $c\ c$, and wedge $h$, arranged and operating together as specified.

ZENAS WHEELER.

Witnesses:
HENRY HAIGHT,
JOHN DRURY.